United States Patent [19]

Meltzer

[11] Patent Number: 4,852,095
[45] Date of Patent: Jul. 25, 1989

[54] ERROR DETECTION CIRCUIT

[75] Inventor: David Meltzer, Wappingers Falls, N.Y.

[73] Assignee: International Business Machines Corporation, Armonk, N.Y.

[21] Appl. No.: 148,826

[22] Filed: Jan. 27, 1988

[51] Int. Cl.⁴ .................. G06F 11/30; G06F 11/00
[52] U.S. Cl. ............................... 371/26; 371/16
[58] Field of Search ............... 371/15, 16, 18, 26, 371/29; 324/73 R

[56] References Cited

U.S. PATENT DOCUMENTS

| | | | |
|---|---|---|---|
| 4,139,818 | 2/1979 | Schneider | 324/73 R |
| 4,184,630 | 1/1980 | Woodward et al. | 371/3 |
| 4,679,195 | 7/1987 | Dewey | 371/29 |

OTHER PUBLICATIONS

IBM J. Res. Devel., Tendolkar et al., "Automated Diagnostic Methodology for the IBM 3081 Processor Complex", vol. 26, No. 1, Jan. 1982, pp. 78–88.

IBM Technical Disclosure Bulletin, vol. 22, No. 1, Jun. 1979, pp. 255–257, "Algorithms for Increased Resolution of Field Replaceable Units", R. J. Kolvick, Jr.

IBM Technical Disclosure Bulletin, vol. 26, No. 11, Apr. 1984, pp. 6078–6079, "Error Sequence Tagging", W. P. Spraul.

IBM Technical Disclosure Bulletin, vol. 26, No. 11, Apr. 1984, pp. 6187–6188, "First Error Detection Circuit", R. H. Barsotti et al.

Primary Examiner—Joseph Ruggiero
Assistant Examiner—Stephen M. Baker
Attorney, Agent, or Firm—Floyd A. Gonzalez

[57] ABSTRACT

An error detection circuit having a plurality of interconnected modules such as field replaceable units, each of the modules being driven by a system clock such that a failed module propagates errors to other modules before the system clock can be stopped. Each of the modules has at least one error checker circuit for generating an error checker signal when an error occurs. Each module includes an error trigger which is set responsive to the detection of an error checker signal, with each error trigger forming the stage of a counter whose count identifies the error trigger which was first set. The counter formed by the error triggers is preferably a Galois field counter which starts to count only upon the receipt of a non-zero impulse to any of its stages, and whose final count contains a unique value which identifies the source of the first non-zero impulse.

8 Claims, 1 Drawing Sheet

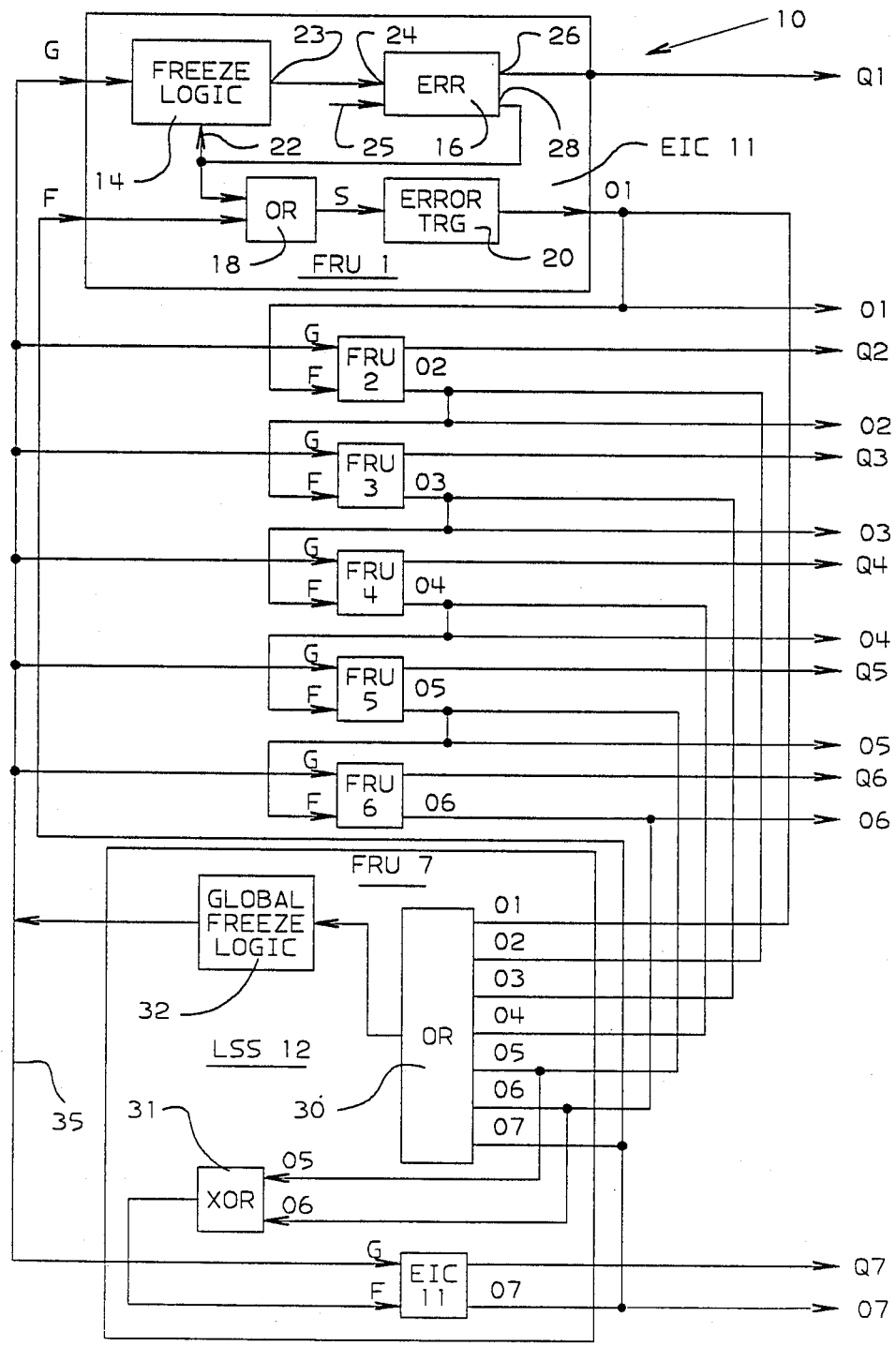

ERROR DETECTION CIRCUIT

BACKGROUND OF THE INVENTION

The present invention relates to an error detection circuit in a data processing system, and more particularly relates to a circuit which identifies a failed module in a data processing system wherein the failed module propagates an error to other modules in the system.

In many data processing systems it is common to divide the data handling circuitry into a multiple of field replaceable units or FRUs, such that if one FRU becomes defective, it can be easily replaced by a field engineer to minimize the down time of the system. In the present application, the FRUs of the data processing system are all controlled by a system clock, and are interconnected such that data outputted from one FRU is inputted into one or more other FRUs. The system clock runs at such high speeds that by the time an error caused by a failed FRU is detected, it has been propagated to other FRUs such that the identification of the failed FRU is difficult to determine.

R. J. Kolvick, Jr., IBM Technical Disclosure Bulletin, Vol. 22, No. 1(June 1979), pages 255–257, "Algorithms for Increased Resolution of Field Replaceable Units" discusses a system in which parity is checked by an Exclusive-OR function resident on each of the FRUs and algorithms for identifying an error condition in either the transmitting FRU or the receiving FRU.

W. P. Spraul, IBM Technical Disclosure Bulletin, Vol. 26, No. 11 (April 1984), pages 6078–6079, "Error Sequence Tagging" discusses a machine having multiple functional units wherein each functional unit has an error sequence counter and an error detection circuit. When an error is detected, each error sequence counter counts sync pulses until they are inhibited by the error detection circuit. The contents of all of the counters are then interrogated to determine which error occurred first to identify the responsible functional unit.

R. H. Barsotti et al, IBM Technical Disclosure Bulletin, Vol. 26, No. 11 (April 1984), pages 6187–6188, "First Error Detection Circuit" discusses a latching circuit which latches a first appearing error indication from one of a plurality of input failure lines. Subsequent changes to error inputs of the latching circuit, after the first appearing error indication, are ignored such that the triggered error may be analyzed for determining component failures.

U.S. Pat. No. 4,679,195 issued July 7, 1987 to Dewey for "Error Tracking Apparatus in a Data Processing System" discloses a data processing system having a plurality of data locations. Each data location has a counter and an error detector. Upon the detection of an error, the counter stops counting, thereby freezing the system cycle count at a value corresponding to the occurrence of the error. The counters at each data location may then be interrogated to determine an error history for the data processing system.

SUMMARY OF THE INVENTION

In a specific embodiment, an error detection circuit is disclosed having a plurality of interconnected modules such as field replaceable units, each of the modules having at least one error checker circuit for generating an error checker signal when an error occurs. Each module includes at least one error trigger which is set responsive to the detection of an error checker signal. Each error trigger forms the stage of a counter whose count identifies the error trigger which was first set, thus identifying the first to fail module. The counter formed by the error triggers is preferably a Galois field counter which starts to count only upon the receipt of a non-zero impulse to any of its stages, and whose final count contains a unique value which identifies the source of the first non-zero impulse.

It is thus an object of the present invention to provide an error detection circuit which identifies a first to fail module of a system of interconnected modules.

It is a further object of the present invention to provide an error detection circuit which includes a counter formed of an error trigger in each module of a system having a plurality of modules, where the counter identifies the first to fail module.

It is a further object of the present invention to provide an error detection circuit in which the counter so formed is a Galois field counter.

Other objects and advantages of the invention will be apparent from the following description taken in connection with the accompanying drawings.

BRIEF DESCRIPTION OF THE DRAWINGS

The figure is a schematic diagram of the present invention wherein field replaceable units (FRUs) are connected to form a counter which identifies a failed FRU upon the occurrence of an error.

DESCRIPTION OF THE PREFERRED EMBODIMENT

The system 10 shown in the figure includes a plurality of field replaceable units labeled FRU1 through FRU7. Each of the field replaceable units FRU1 through FRU7 includes circuitry identical to error isolation circuitry (EIC) 11 shown in FRU1. The EIC 11 includes freeze logic 14, an error reporting register circuit (ERR) 16, an OR gate 18, and an error trigger 20. The output of the error trigger 20 forms an output of its respective FRU. Thus, the error trigger outputs of FRU1 through FRU7 are 01 through 07, respectively. The freeze logic 14 has a G input for receiving a global freeze signal (to be discussed), a second input 22 for receiving a local freeze signal, and an output 23 which is connected to and provides freeze reporting signals to an input 24 of the ERR 16. The ERR 16 has one or more error inputs 25 from error checker circuitry in the FRU (not shown) for indicating to the ERR 16 when an error has occurred. The ERR 16 has a first output 26 for providing an error message when an error has occurred in the field replaceable unit, and which may include a multi-bit code showing the type of error which occurred. The ERR 16 also has a second output 28 which is connected to the input 22 of the freeze logic 14 and to a first input of the OR gate 18. A second input of the OR gate 18 is connected to an F input of the EIC 11 with the F input being connected to the error trigger output of the immediately preceding FRU (in the case of FRU1, the error trigger output of FRU7) for receiving count signals. FRU7 includes an EIC 11' identical to the EIC 11 of FRU1, as previously mentioned, as well as circuitry to form a logic support station (LSS) 12, to be discussed later.

The ERR outputs 26 of FRU1 through FRU7 are labeled Q1 through Q7 respectively, and may be connected to an error bus (not shown) for providing the contents of the ERRs 16 to a processor for analysis, in a manner well known in the art. The inputs 24 and 25 are typically ORed by appropriate circuitry in the ERR 16 such that, upon receipt of either a freeze reporting signal from the freeze logic 14 or an error checker signal from one of the inputs 25, an error message will be produced on the output 26 and a local freeze signal will be produced on the output 28. This local freeze signal from output 28 is inputted into the freeze logic 14, via input 22, and the first input of the OR gate 18. The freeze logic 14 contains circuitry (not shown) for stopping the system clock (not shown), thereby stopping the processing of data by the system 10. As previously mentioned, the system clock will continue to run for several cycles between the appearance of an error checker signal on one of the inputs 25 and the stopping of the system clock by the freeze logic 14. The freeze logic 14 is well understood in the art and will not be discussed further herein.

The illustrated error trigger 20 includes a two state device having its set (S) input connected to the output of the OR gate 18 for receiving error signals therefrom. The freeze logic 14, when enabled by a signal on either its G input or its second input 22, stops further error checker signals from registering in the ERR 16, and also stops further error signals from the OR gate 18 from setting the error trigger 20. The error trigger output of its respective FRU is connected to the F input of the following FRU, and is also connected to one of the inputs of a multiple input OR gate 30 of the LSS 12. The 05 and 06 outputs are connected to the inputs of an Exclusive-OR gate 31, whose output is connected to the F input of EIC 11'. The output of the OR gate 30 is connected to the input of the global freeze logic circuit 32, whose output is connected to the G input of each of the field replaceable units FRU1 through FRU7 via conductor 35. As all of the FRUs are driven by the system clock, the output of the error trigger 20 will be a non-zero on the cycle after either a freeze signal from the output 28 of the ERR 16, or a non-zero impulse from the preceding FRU via its EIC input F. The output will then return to its zero state on the next system clock cycle.

In the illustrated example, the error triggers 20 function as modulo 2 counters, and are inter-connected such that each error trigger 20 is a stage of Galois field counter for counting in accordance with an irreduceable polynomial in the GF (2N), where N is chosen such that 2N is equal to or greater than the number of cycles necessary to stop the system clock. As is known, the Galois field counter will not count unless a non-zero value has been entered into the counter by one of the error triggers 20. The error trigger 20 of the first failing FRU will supply the initial non-zero impulse to the Galois field counter when the first error occurs. As is known, the modulo 2 counters may be interconnected differently for the particular polynomial equation being solved by the Galois field counter. For instance, the Exclusive-OR 31 might be connected differently, or more than one Exclusive-OR gate might be used, depending on the particular polynomial equation being solved. The count appearing on outputs 01 through 07 always identifies the field replaceable unit giving the first non-zero impulse to the Galois field counter thus formed. By knowing the number of cycles necessary to stop the system clock, the Galois field count on outputs 01 through 07 may be examined to determine which of the FRUs caused the initial non-zero impulse to start the Galois field counter. It will be understood that when the global freeze logic 32 determines that a failure has occurred, it will supply a global freeze signal over conductor 35 to each of the G inputs of the FRUs, instructing each local freeze logic 14 stop sets of its error trigger 20, thereby freezing the count of the Galois field counter. Since the number of cycles between the receipt of an error checker signal over one of the inputs 25 to the freezing of the Galois field count by the local freeze logic circuits 14 of FRU1 through FRU7 is a specified design parameter, the cycles between the occurrence of the first error and the final Galois field count is always known.

In operation, when an error occurs, the error trigger 20 of the field replaceable unit with the first occurrence of an error comes on, thereby introducing the first non-zero value into the Galois field logic. After one cycle, the local freeze logic 14 stops any subsequent errors from being registered in the ERR 16 and the error trigger 20 of that field replaceable unit. The non-zero value propagates through the Galois field counter and the counter feedback path of the LSS 12 until a global freeze signal is issued by the global freeze logic 32. Error checker signals received by any of the field replaceable units FRU1-FRU7 after the global freeze signal is issued by the global freeze logic 32 are not counted by the Galois field counter, and the unique value determined by the signals on the outputs 01 through 07 after the freezing of all of the local freeze logic circuits 14 identifies the field replaceable unit having the first occurrence of an error.

Table 1 shows the values of the signals on the outputs 01 through 07 for the first through fifth cycles after the occurrence of a single error in the identified field replaceable unit. By knowing the cycle in which a global freeze occurs, the table may be entered for that cycle to determine which field replaceable unit was the first to fail. Similar tables may be constructed in a case where a failing field replaceable unit causes the Galois field counter to start to count, and the error is then propagated to other field replaceable unit/s to cause multiple errors before the system clock is stopped. Even in the case of such multiple errors, a unique Galois field count will be produced which will identify the first-to-fail field replaceable unit.

TABLE 1

| OUTPUTS | | | | | | | | |
|---|---|---|---|---|---|---|---|---|
| 01 | 02 | 03 | 04 | 05 | 06 | 07 | | |
| Error in FRU1 | | | | | | | | |
| 0 | 1 | 0 | 0 | 0 | 0 | 0 | Cycle | 2 |
| 0 | 0 | 1 | 0 | 0 | 0 | 0 | | 3 |
| 0 | 0 | 0 | 1 | 0 | 0 | 0 | | 4 |
| 0 | 0 | 0 | 0 | 1 | 0 | 0 | | 5 |
| 0 | 0 | 0 | 0 | 0 | 1 | 1 | | 6 |
| Error in FRU2 | | | | | | | | |
| 0 | 0 | 1 | 0 | 0 | 0 | 0 | Cycle | 2 |
| 0 | 0 | 0 | 1 | 0 | 0 | 0 | | 3 |
| 0 | 0 | 0 | 0 | 1 | 0 | 0 | | 4 |
| 0 | 0 | 0 | 0 | 0 | 1 | 1 | | 5 |
| 1 | 0 | 0 | 0 | 0 | 0 | 1 | | 6 |
| Error in FRU3 | | | | | | | | |
| 0 | 0 | 0 | 1 | 0 | 0 | 0 | Cycle | 2 |
| 0 | 0 | 0 | 0 | 1 | 0 | 0 | | 3 |
| 0 | 0 | 0 | 0 | 0 | 1 | 1 | | 4 |
| 1 | 0 | 0 | 0 | 0 | 0 | 1 | | 5 |
| 1 | 1 | 0 | 0 | 0 | 0 | 0 | | 6 |
| Error in FRU4 | | | | | | | | |
| 0 | 0 | 0 | 0 | 1 | 0 | 0 | Cycle | 2 |
| 0 | 0 | 0 | 0 | 0 | 1 | 1 | | 3 |
| 1 | 0 | 0 | 0 | 0 | 0 | 1 | | 4 |
| 1 | 1 | 0 | 0 | 0 | 0 | 0 | | 5 |
| 0 | 1 | 1 | 0 | 0 | 0 | 0 | | 6 |
| Error in FRU5 | | | | | | | | |
| 0 | 0 | 0 | 0 | 0 | 1 | 1 | Cycle | 2 |

TABLE 1-continued

| | | | OUTPUTS | | | | | |
|---|---|---|---|---|---|---|---|---|
| 01 | 02 | 03 | 04 | 05 | 06 | 07 | | |
| 1 | 0 | 0 | 0 | 0 | 0 | 1 | | 3 |
| 1 | 1 | 0 | 0 | 0 | 0 | 0 | | 4 |
| 0 | 1 | 1 | 0 | 0 | 0 | 0 | | 5 |
| 0 | 0 | 1 | 1 | 0 | 0 | 0 | | 6 |
| Error in FRU6 | | | | | | | | |
| 0 | 0 | 0 | 0 | 0 | 0 | 1 | Cycle | 2 |
| 1 | 0 | 0 | 0 | 0 | 0 | 0 | | 3 |
| 0 | 1 | 0 | 0 | 0 | 0 | 0 | | 4 |
| 0 | 0 | 1 | 0 | 0 | 0 | 0 | | 5 |
| 0 | 0 | 0 | 1 | 0 | 0 | 0 | | 6 |
| Error in FRU7 | | | | | | | | |
| 1 | 0 | 0 | 0 | 0 | 0 | 0 | Cycle | 2 |
| 0 | 1 | 0 | 0 | 0 | 0 | 0 | | 3 |
| 0 | 0 | 1 | 0 | 0 | 0 | 0 | | 4 |
| 0 | 0 | 0 | 1 | 0 | 0 | 0 | | 5 |
| 0 | 0 | 0 | 0 | 1 | 0 | 0 | | 6 |

The input 25 may, in the alternative, represent an error input from a group of field replaceable units, rather than from a component in a single field replaceable unit. In that case, input 25 represents the output of a global freeze logic circuit of a separate Galois field counter similar to that shown in the figure. In such an arrangement, one Galois field counter would point to a single group of several groups of field replaceable units, and the Galois field counter for that group of field replaceable units would further point to the individual field replaceable unit having the initial error.

While the invention has been particularly shown and described with reference to one preferred embodiment thereof, it will be understood by those skilled in the art that the foregoing and other changes in form and details may be made therein without departing from the spirit and scope of the invention.

Having thus described my invention, what I claim as new and desire to secure by Letters Patent is:

1. In a system having a plurality of modules driven by a system clock, each of said modules having error checker means for generating an error checker signal when an error occurs, an error detection circuit comprising:
   error detection means for each of said modules, said error detection means generating an error signal responsive to said error checker signal;
   error trigger means for each of said modules and having an input for receiving said error signal from a respective one of said error detection means and an output, said error trigger means sensing said corrected error signal from said error detection means; and
   connection means connected to the outputs of said error trigger means for forming a counter, with each of said error trigger means forming a stage of said counter wherein the count of said counter indicates the first of said error trigger means to sense said error signal on its input.

2. The error detection circuit of claim 1 wherein each of said error trigger means includes a modulo two counter.

3. The error detection circuit of claim 1 wherein said connection means connects said plurality of error trigger means to form a Galois field counter.

4. The error detection circuit of claim 3 wherein each of said error detection means comprises:
   error reporting register means having a first input for receiving said error checker signal when an error has occurred, and an output for generating a local freeze signal responsive to said error checker signal;
   local freeze logic means having an input connected to the output of said error reporting register means, said local freeze logic means for stopping said system clock responsive to said local freeze signal; and
   a first OR gate having a first input connected to the output of said error reporting register means, a second input connected by said connecting means to the output of the error trigger means of the immediately preceding stage of said counter, and an output connected to the input of its respective error trigger means, said first OR gate generating said error signal responsive to either said local freeze signal from said error reporting register or a count signal from said immediately preceding stage.

5. The error detection circuit of claim 4 wherein said local freeze logic means has a second input, and wherein said connecting means comprises:
   a second OR gate having multiple inputs and an output, each of said multiple inputs being connected to the output of one of said error trigger means;
   global freeze logic means having an input connected to the output of said second OR gate and an output, said global freeze logic means for generating a global freeze signal on its output responsive to said second OR gate; and
   a global freeze conductor connected between the output of said global freeze logic means and the second input of each of said local freeze logic means, said global freeze conductor for transmitting said global freeze signal from said global freeze logic means to all of said local freeze logic means such that, responsive to said global freeze signal, error signals of said modules subsequent to said global freeze signal are not counted by said counter.

6. The error detection circuit of claim 5 wherein each of said local freeze logic means has an output for generating a freeze reporting signal responsive to either of said local freeze signal or said global freeze signal, and said error reporting register means has a second input connected to the output of said local freeze logic means and includes means for reporting the presence of said error checker signal and said freeze reporting signal on its first and second inputs, respectively.

7. The error detection circuit of claim 5 wherein said connecting means further comprises at least one Exclusive-OR gate having inputs connected to selected ones of the outputs of said error trigger means, and an output connected to the second input of at least one of said first OR gates such that the count of said Galois field counter counts in accordance with an irreducible polynomial in the GF(2**N);
   where N is chosen such that 2**N is equal to or greater than the number of cycles necessary for said system clock to be stopped by said global freeze logic means after the set of the first of said error trigger means by the detection of said error signal.

8. The error detection circuit of claim 7 further comprising a second Galois field counter having a plurality of stages, said global freeze conductor of said first Galois field counter being connected to one stage of said second Galois field counter such that said second Galois field counter indicates which group of several groups of modules detects a first error signal, and said first Galois field counter indicates which individual module of that group detects said first error signal.

* * * * *